United States Patent
Lescoche et al.

(10) Patent No.: US 11,806,893 B2
(45) Date of Patent: Nov. 7, 2023

(54) METHOD FOR MATERIAL ADDITIVE MANUFACTURING OF AN INORGANIC FILTER SUPPORT AND RESULTING MEMBRANE

(71) Applicant: TECHNOLOGIES AVANCEES ET MEMBRANES INDUSTRIELLES, Nyons (FR)

(72) Inventors: Philippe Lescoche, Piegon (FR); Jérôme Anquetil, Vaison la Romaine (FR)

(73) Assignee: TECHNOLOGIES AVANCEES ET MEMBRANES INDUSTRIELLES, Nyons (FR)

( * ) Notice: Subject to any disclaimer, the term of this patent is extended or adjusted under 35 U.S.C. 154(b) by 299 days.

(21) Appl. No.: 17/296,724

(22) PCT Filed: Nov. 26, 2019

(86) PCT No.: PCT/FR2019/052807
§ 371 (c)(1),
(2) Date: May 25, 2021

(87) PCT Pub. No.: WO2020/109715
PCT Pub. Date: Jun. 4, 2020

(65) Prior Publication Data
US 2022/0032499 A1 Feb. 3, 2022

(30) Foreign Application Priority Data
Nov. 27, 2018 (FR) ...................................... 1871947

(51) Int. Cl.
*B28B 1/00* (2006.01)
*B33Y 10/00* (2015.01)
(Continued)

(52) U.S. Cl.
CPC .............. *B28B 1/001* (2013.01); *B01D 69/10* (2013.01); *B33Y 10/00* (2014.12); *B33Y 30/00* (2014.12);
(Continued)

(58) Field of Classification Search
CPC ........... B28B 1/00; B33Y 70/00; B33Y 80/00; B33Y 30/00; C04B 2235/3232;
(Continued)

(56) References Cited

U.S. PATENT DOCUMENTS 5,007,475 A * 4/1991 Kennedy ............... C22C 1/1036
164/97
5,656,168 A 8/1997 Millares
(Continued)

FOREIGN PATENT DOCUMENTS

| CN | 105582571 A | 5/2016 |
|---|---|---|
| CN | 107098717 A | 8/2017 |
| WO | 2015/069849 A1 | 5/2015 |

OTHER PUBLICATIONS

Indian Examination Report, dated Nov. 28, 2022, corresponding to Indian Application No. 202117027055.
(Continued)

*Primary Examiner* — Nahida Sultana
(74) *Attorney, Agent, or Firm* — LADAS & PARRY LLP; Malcolm J. MacDonald, Esq.

(57) ABSTRACT

The present invention relates to a method for manufacturing at least one monolithic inorganic porous support (1) having a porosity comprised between 10% and 60% and an average pore diameter ranging from 0.5 μm to 50 μm, using a 3D printer type machine (I) to build, in accordance with a 3D digital model, a manipulable three-dimensional raw structure (2) intended to form, after sintering, the monolithic inorganic porous support(s) (1).

12 Claims, 13 Drawing Sheets

(51) Int. Cl.
  *B33Y 30/00* (2015.01)
  *B33Y 70/00* (2020.01)
  *B33Y 80/00* (2015.01)
  *B01D 69/10* (2006.01)
  *C04B 35/46* (2006.01)
  *C04B 35/634* (2006.01)
  *C04B 35/636* (2006.01)
  *C04B 38/00* (2006.01)

(52) U.S. Cl.
  CPC .............. *B33Y 70/00* (2014.12); *B33Y 80/00* (2014.12); *C04B 35/46* (2013.01); *C04B 35/6365* (2013.01); *C04B 35/63488* (2013.01); *C04B 38/0054* (2013.01); *C04B 38/0074* (2013.01); *C04B 2235/3232* (2013.01); *C04B 2235/5436* (2013.01); *C04B 2235/5445* (2013.01); *C04B 2235/665* (2013.01)

(58) Field of Classification Search
  CPC ...... C04B 2235/5436; C04B 2235/544; C04B 2235/665; C04B 2235/3206; C04B 2235/3217; C04B 2235/3244; C04B 2235/3826; C04B 2235/404
  See application file for complete search history.

(56) References Cited

U.S. PATENT DOCUMENTS

| | | | |
|---|---|---|---|
| 5,906,863 A * | 5/1999 | Lombardi | B33Y 70/10 427/407.1 |
| 2006/0002810 A1* | 1/2006 | Grohowski, Jr. | B22F 1/103 419/2 |
| 2011/0129640 A1* | 6/2011 | Beall | C04B 35/63492 428/116 |
| 2015/0158760 A1* | 6/2015 | Binhussain | B28B 1/004 264/628 |
| 2016/0121271 A1 | 5/2016 | Lescoche et al. | |
| 2017/0232393 A1 | 8/2017 | Anquetil | |
| 2019/0321890 A1 | 10/2019 | Lescoche et al. | |

OTHER PUBLICATIONS

International Search Report, dated May 7, 2020, corresponding to PCT/FR2019/052807.
French Search Report, dated Oct. 22, 2019, corresponding to FR 1871947.
"Report on Engineering Training and Internship", Fused Deposition Modeling (FDM), 2016, p. 276.

* cited by examiner

[Fig. 1]
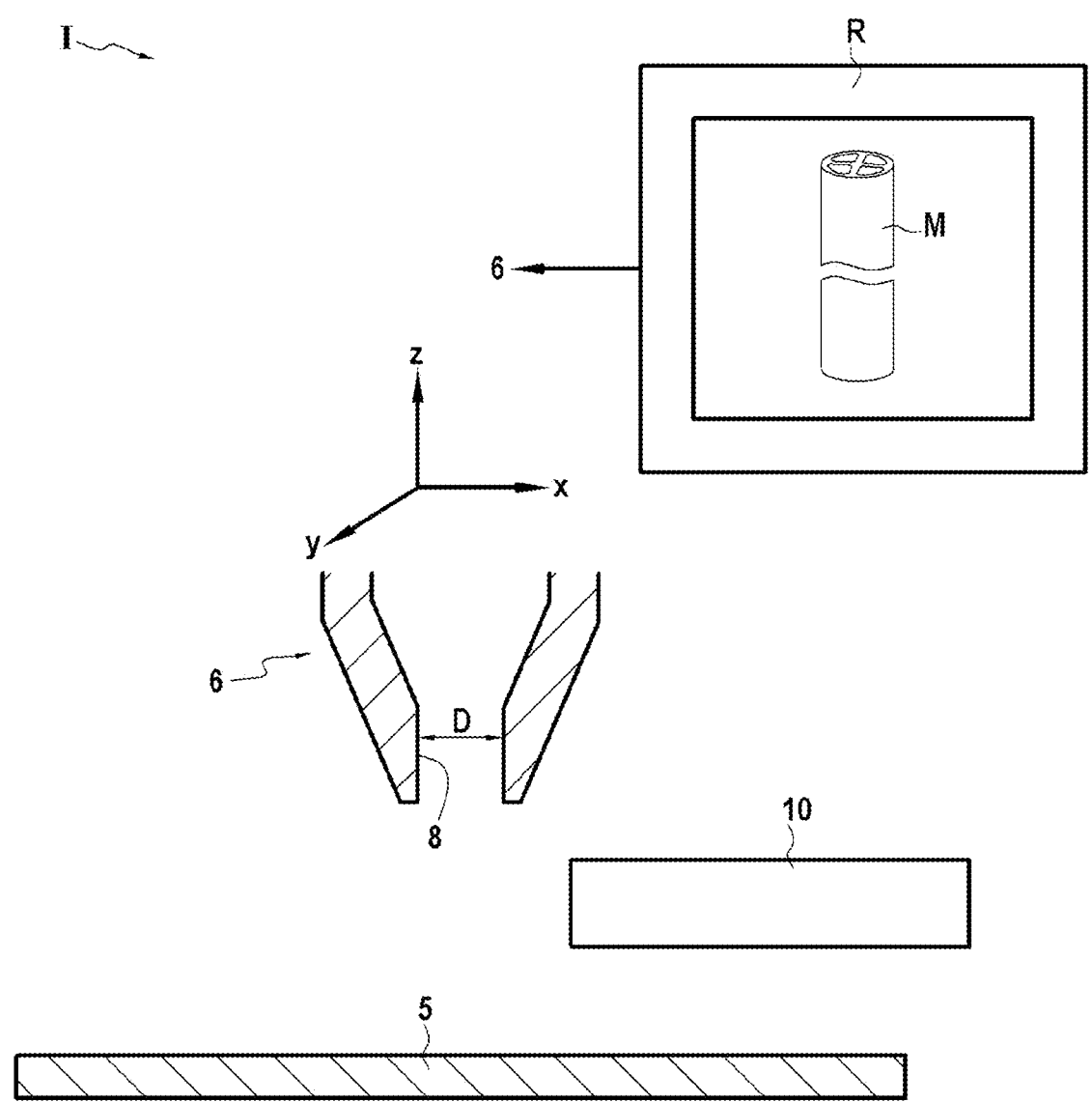

[Fig. 2]
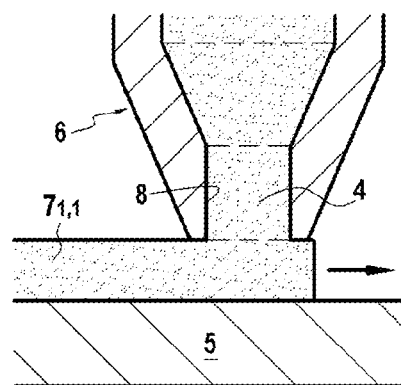
[Fig. 3]
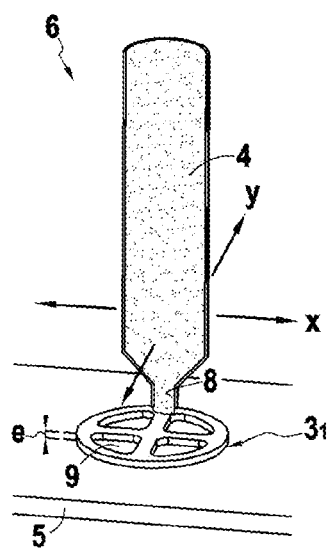

[Fig. 4]
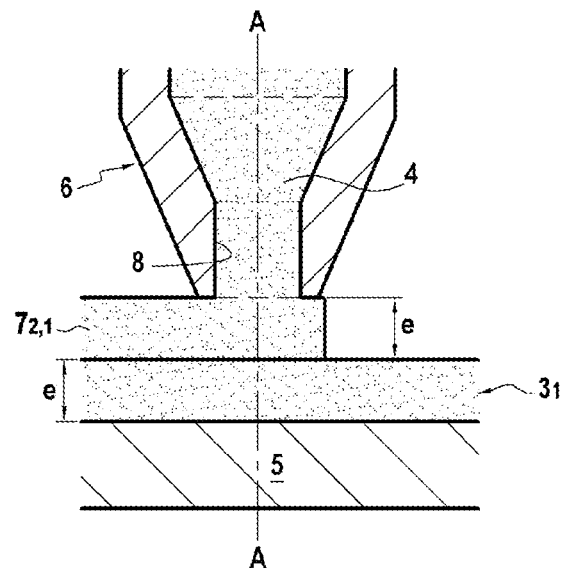
[Fig. 5]
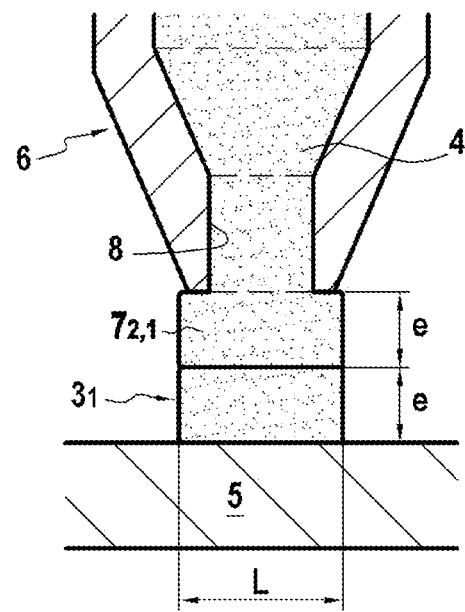

[Fig. 6]
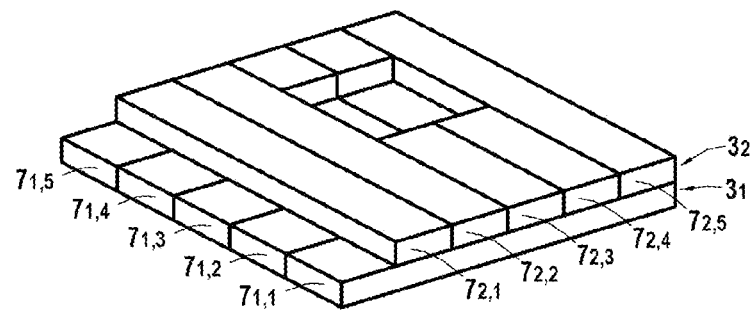
[Fig. 7]
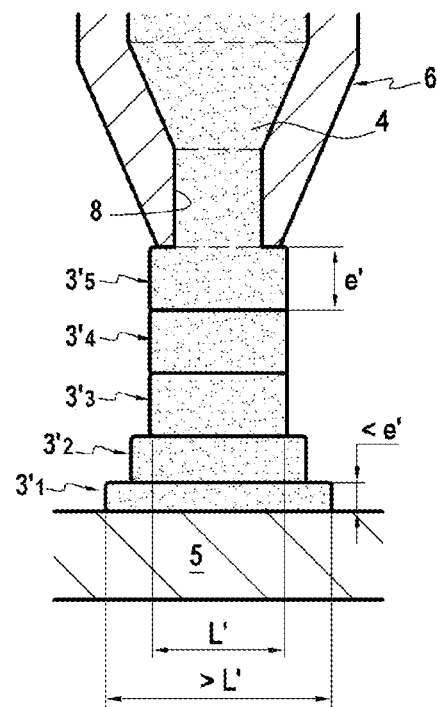

[Fig. 8]
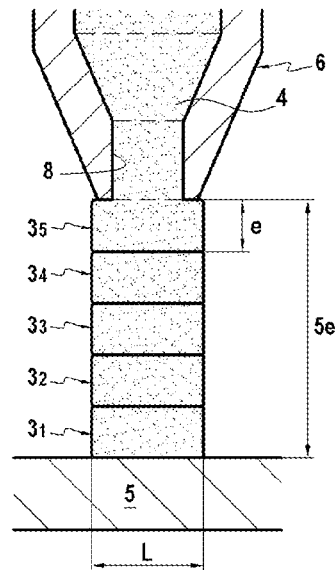
[Fig. 9]
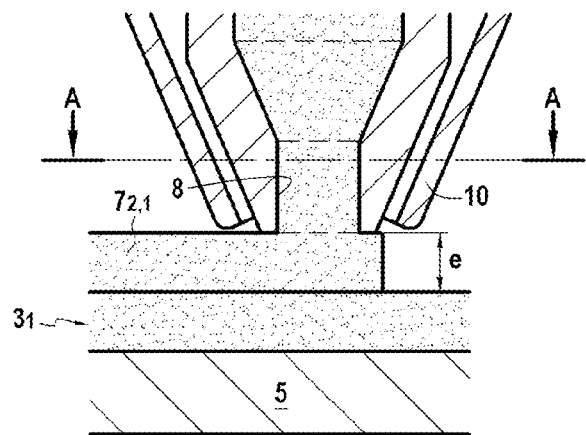
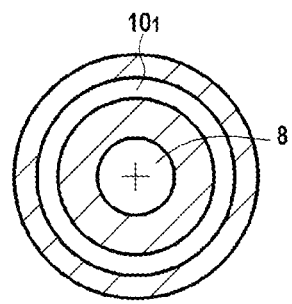
FIG.10A
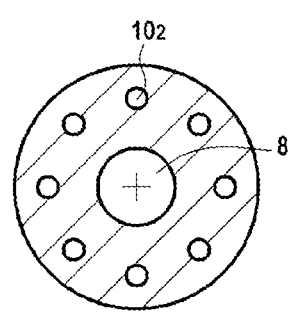
FIG.10B

[Fig. 11]
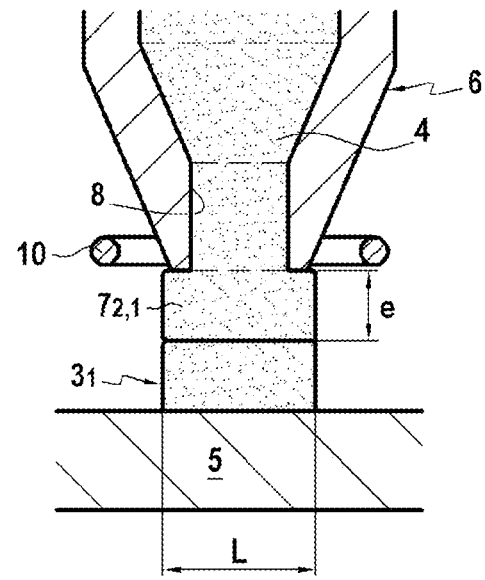
[Fig. 12A]
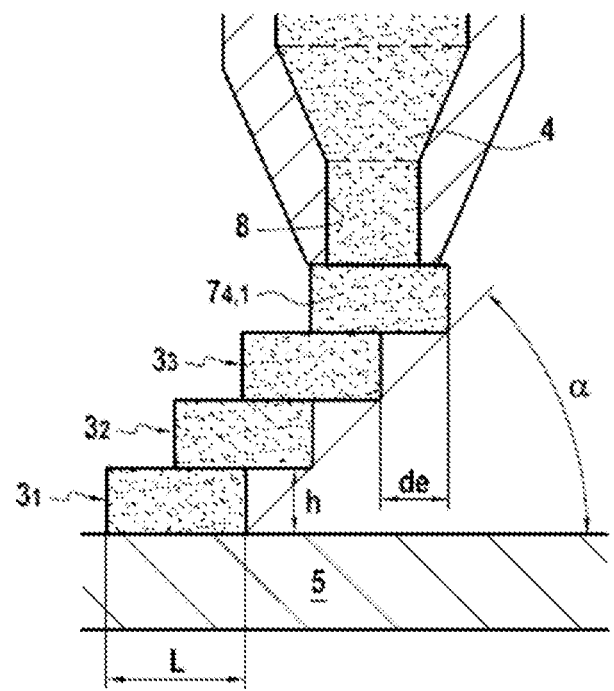

[Fig. 12B]
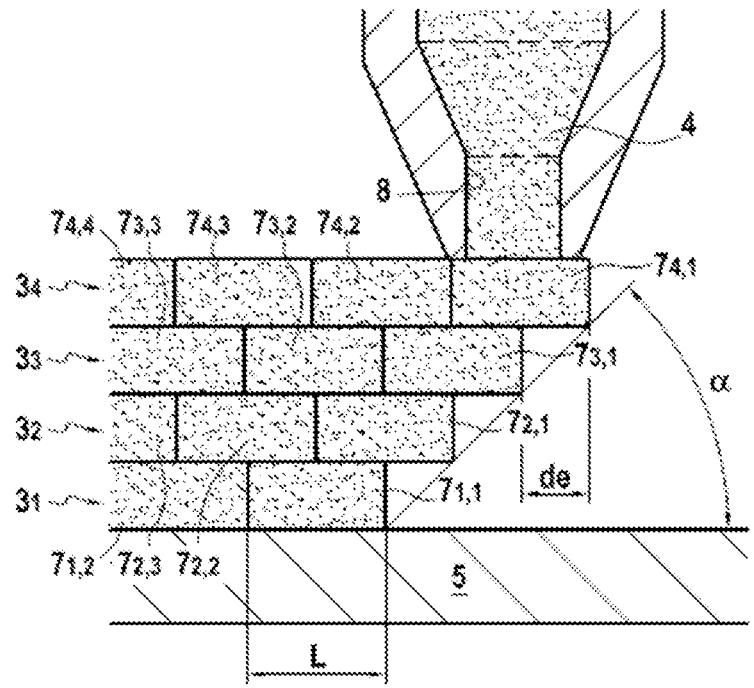
[Fig. 13]
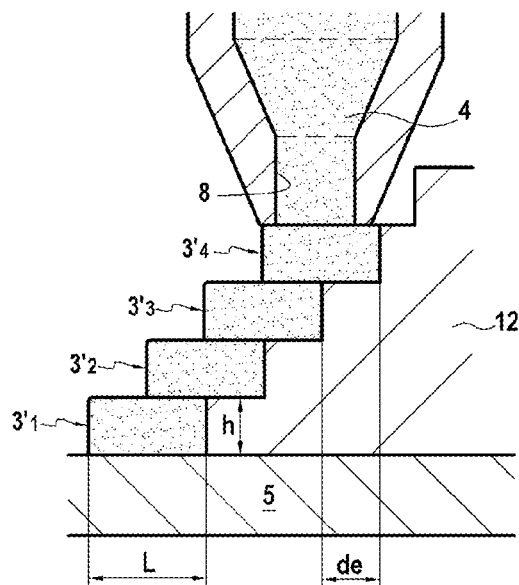

[Fig. 14]
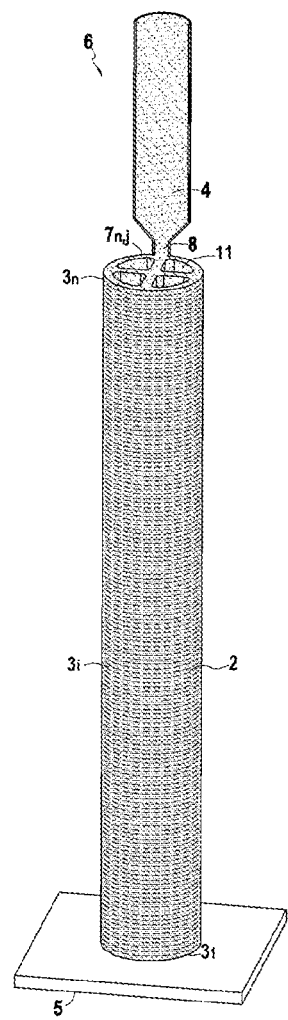

[Fig. 15]
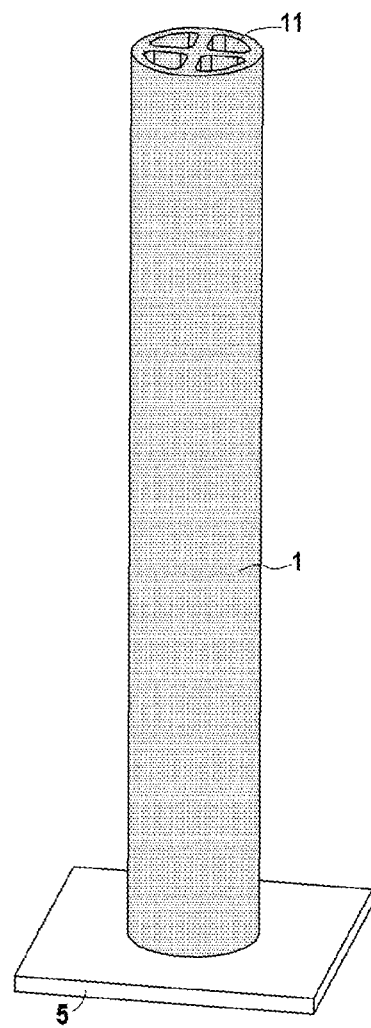

[Fig. 17]
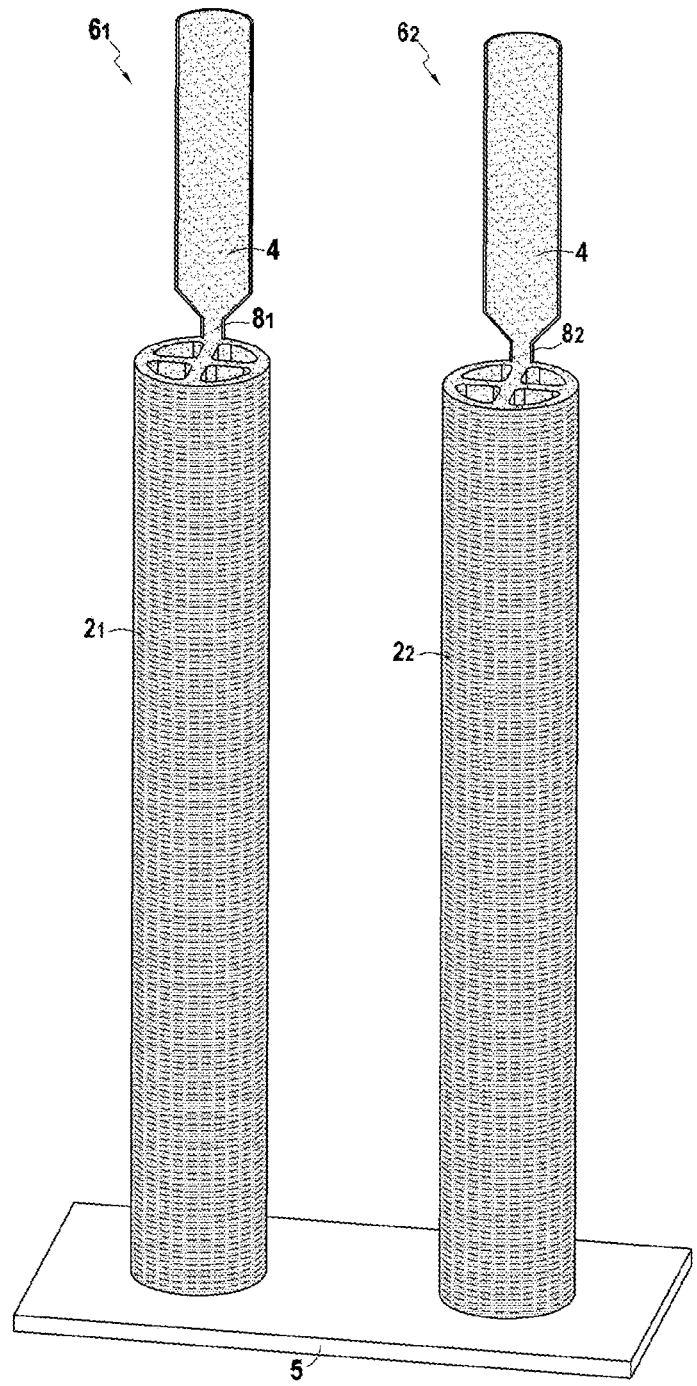

[Fig. 18]
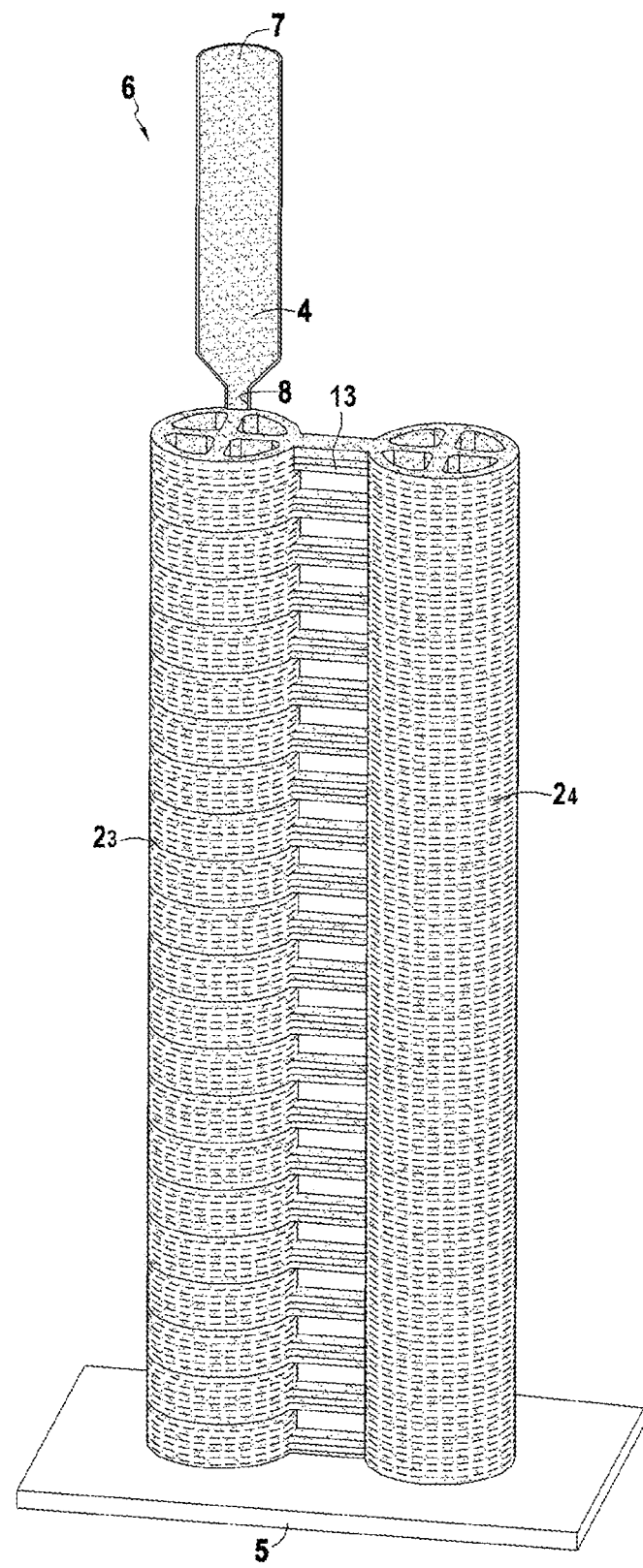

[Fig. 19]
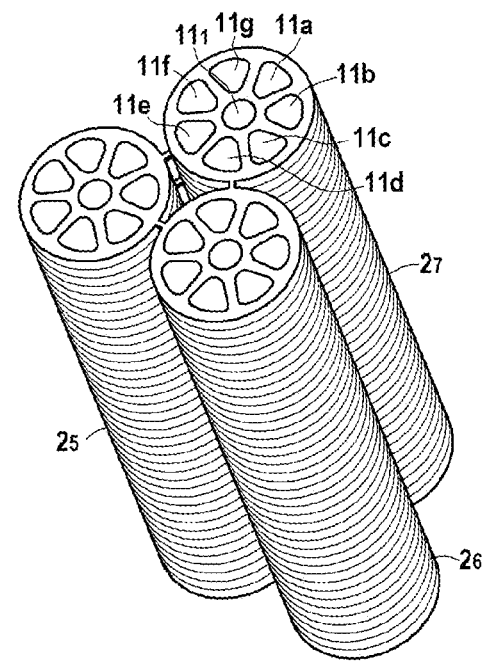

METHOD FOR MATERIAL ADDITIVE MANUFACTURING OF AN INORGANIC FILTER SUPPORT AND RESULTING MEMBRANE

The present invention relates to a method for manufacturing a monolithic inorganic porous support, which can in particular be used in a filtration membrane, and particularly a tangential filtration membrane. More specifically, the porous support is prepared by a technique proceeding with the addition of material.

A filtration membrane constitutes a selective barrier and allows, under the action of a transfer force, the passage or the stopping of some components of the medium to be treated. The passage or the stopping of the components can result from their size relative to the size of the pores of the membrane which then behaves like a filter. Depending on the size of the pores, these techniques are called microfiltration, ultrafiltration or nanofiltration.

A membrane consists of a porous support on which one or more separation layer(s) is/are deposited. Conventionally, the support is first manufactured by extrusion. The support then undergoes a sintering so as to achieve the required solidity, while maintaining an open and interconnected porous texture. This method requires obtaining rectilinear channels inside which the separating layer(s) is/are then deposited and sintered. The thus made membrane therefore undergoes at least two sintering operations. The organic binders added during the preparation of the paste, before its extrusion, completely burn off during the sintering of the support.

The Applicant has described in the application FR 3 006 606 the preparation of a filtration membrane whose porous support is made by an additive technique, by repeated deposition of a continuous powder bed followed by localized consolidation according to a predetermined pattern. This technique allows preparing filtration membranes that are mechanically resistant and suitable for use in tangential filtration. However, this technique has the disadvantage of requiring adjusting the fluidity of the powder to allow its perfect flow during the deposition of the powder bed. In addition, this technique requires removing the unconsolidated powder, to also possibly recycle it, which can be tricky, time-consuming and expensive, in particular when said unconsolidated powder is present in non-rectilinear channels of the porous support.

Within the framework of the invention, there is proposed a new method for preparing a porous support which does not have the drawbacks of the prior art, and particularly which is rapid, easy to implement, which allows obtaining a mechanically resistant porous support whose shape and in particular that of the non-rectilinear channels, is easily varied. For that, the method uses the technique of the 3D printing allowing obtaining a manipulable three-dimensional raw structure, followed by a sintering step. The porous support obtained is homogeneous, mechanically resistant and has a porosity suitable for use in filtration, that is to say a porosity comprised between 10 and 60% and which is open and interconnected with an average pore diameter ranging from 0.5 µm to 50 µm.

The method according to the invention also has the advantage of allowing the preparation of a large-dimension monolithic porous support (that is to say a height greater than 1 m), and particularly greater than the preparation possible using an additive technique of depositing a continuous powder bed followed by a localized consolidation achieved with the machines currently on the market, and in particular described in the application FR 3 006 606.

In addition, the method according to the invention allows the preparation of a support with tilts without requiring the use of supporting means.

In this context, the present invention relates to a method for manufacturing at least one monolithic inorganic porous support having a porosity comprised between 10% and 60% and an average pore diameter ranging from 0.5 µm to 50 µm, using a 3D printing machine including at least one extrusion head movably mounted in space relative to and above a fixed horizontal plate, said 3D printing machine allowing the deposition of a string of inorganic composition to build, from a 3D digital model, a manipulable three-dimensional raw structure intended to form the monolithic inorganic porous support(s), the method consisting of:

- having the inorganic composition including a powdery solid inorganic phase in the form of particles with an average diameter comprised between 0.1 µm and 150 µm, and a matrix,
- supplying the extrusion head of the 3D printing machine with the inorganic composition and causing its extrusion to form the string,
- building, using said string on said horizontal plate, the manipulable three-dimensional raw structure in accordance with the 3D digital model,
- accelerating the consolidation of the manipulable three-dimensional raw structure in accordance with the 3D digital model as the string is extruded,
- placing this manipulable three-dimensional raw structure in a heat treatment furnace in order to carry out a sintering operation at a temperature comprised between 0.5 and 1 time the melting temperature of at least one material forming the powdery solid inorganic phase.

Within the framework of the invention, the monolithic inorganic porous support can in particular be used as a filtration membrane support, and particularly as a tangential filtration membrane support.

The method according to the invention includes either or both of the following additional characteristics:

- the manipulable three-dimensional raw structure is made with a tilt without implementing a supporting means;
- the powdery solid inorganic phase comprises one or more oxides, and/or carbides and/or nitrides, and/or metals, preferably chosen among titanium oxide, aluminum oxide, zirconium oxide, magnesium oxide, silicon carbide, titanium and stainless steel, and particularly titanium oxide;
- the matrix comprises at least one solvent and at least one organic additive soluble in said solvent;
- the rheology of the inorganic composition is adjusted thanks to at least one of the following characteristics: the granularity of the powdery solid inorganic phase, the nature, and/or the proportion of the organic additives when they are present;
- the consolidation of the three-dimensional structure is accelerated using a convective or radiative consolidation device causing the evaporation of at least one solvent contained in the matrix;
- the consolidation of the three-dimensional structure is accelerated using a convective consolidation device allowing providing locally by convection either a heating of the string or a renewal of the atmosphere around the string sufficient to allow an accelerated evaporation of one or more solvent(s) contained in the matrix;
- the consolidation of the three-dimensional structure is accelerated using a radiative consolidation device allowing providing locally by radiation a heating sufficient to allow an accelerated evaporation of one or more solvent(s) contained in the matrix;

the manipulable three-dimensional raw structure is made in the form of several three-dimensional sub-structures detachable from each other;

the manipulable three-dimensional raw structure is made in the form of several three-dimensional sub-structures connected and held together by at least one breakable bridge made using the string of inorganic composition;

several extrusion heads mounted secured to each other are moved to simultaneously make several independent three-dimensional structures each constructed by an extrusion head.

The invention also relates to a monolithic inorganic porous support obtainable by the method according to the invention.

The invention also relates to a method for preparing a tangential filtration membrane comprising the preparation according to the invention of a monolithic inorganic porous support in which is arranged at least one channel for the circulation of the fluid medium to be treated, followed by a step of creating one or more separating layer(s). Finally, the invention relates to a tangential filtration membrane obtainable by such a method.

Various other characteristics emerge from the description given below with reference to the appended drawings which show, by way of non-limiting examples, embodiments of the object of the invention.

FIG. 1 is a diagram illustrating the 3D printing machine used within the framework of the invention.

FIG. 2 is a sectional view of the deposition of a string of inorganic composition on the horizontal plate.

FIG. 3 is a perspective view of the deposition of a first string on the horizontal plate.

FIG. 4 is a sectional view of the deposition of a string of inorganic composition on a first stratum of inorganic composition FIG. 5 is a sectional view along the axis AA of FIG. 4.

FIG. 6 is a perspective view schematically showing two strata each composed of juxtaposed strings and deposited at 90° from one stratum to another, the strings of the first stratum being continuous and the strings of the second stratum being discontinuous to create a rectangular void.

FIG. 7 is a sectional view of a raw structure excluding the invention for which a collapse phenomenon is observed.

FIG. 8 is a sectional view of a raw structure according to the invention for which no collapse phenomenon is observed.

FIG. 9 is a sectional view of the deposition of a string of inorganic composition using an extrusion head integrating a convective consolidation device.

FIGS. 10A and 10B are sectional views along the axis A of FIG. 9 of the extrusion head, with a tapered annular slot (FIG. 10A) or inclined orifices (FIG. 10B).

FIG. 11 is a sectional view of the deposition of a string of inorganic composition using an extrusion head associated with a radiative consolidation device.

FIG. 12A is a sectional view illustrating one embodiment for which the three-dimensional structure has a tilt without supporting means.

FIG. 12B is a sectional view illustrating one embodiment for which the three-dimensional structure has a tilt without supporting means, and in which each stratum is formed by the juxtaposition of several strings.

FIG. 13 is a sectional view illustrating one embodiment excluding the invention for which the three-dimensional structure has a tilt with a supporting means.

FIG. 14 is a perspective view of a manipulable raw structure under construction, in accordance with the invention.

FIG. 15 is a perspective view of a monolithic inorganic porous support in accordance with the invention.

FIG. 17 is a perspective view of two distinct manipulable three-dimensional raw structures constructed in parallel.

FIG. 18 is a perspective view of a manipulable three-dimensional raw structure formed of two detachable three-dimensional sub-structures connected by breakable bridges.

FIG. 19 is a perspective view of a manipulable three-dimensional raw structure in the form of three detachable three-dimensional sub-structures connected by breakable bridges.

Figure 16A:
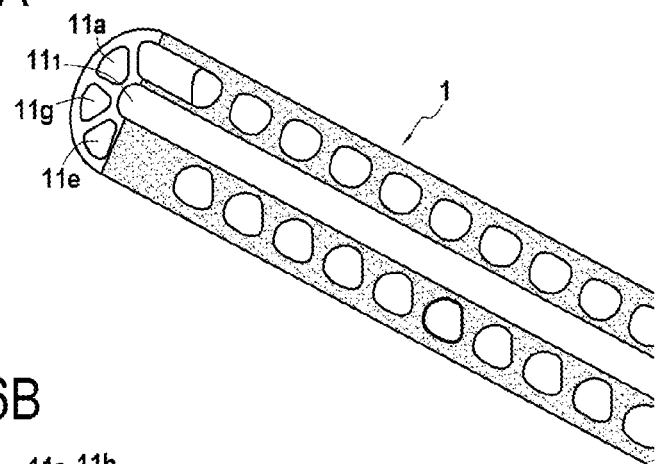
FIG. 16A is a sectional view of a monolithic inorganic porous support including a rectilinear central channel and seven helical channels wrapped around said central channel.

The invention relates to the preparation of a monolithic inorganic porous support 1, as well as a filtration membrane including the monolithic inorganic porous support 1 according to the invention comprising channels on the walls of which one or more separating layer(s) are deposited.

Within the framework of the invention, the aim is to manufacture monolithic inorganic porous supports for fluid filtration membranes, and more particularly for tangential filtration membranes. Such porous supports are generally of tubular geometry and include at least one channel or path for the circulation of the fluid to be filtered. These circulation channels have an inlet and an outlet. In general, the inlet of the circulation channels is positioned at one of the ends of the porous support, this end playing the role of inlet zone for the fluid medium to be treated and their outlet is positioned at another end of the porous support playing the role of an outlet zone for the retentate. The inlet zone and the outlet zone are connected by a continuous peripheral zone at which the permeate is recovered.

In a filtration membrane, the walls of the circulation channel(s) is/are continuously covered by at least one separating layer which filters the fluid medium to be treated. The separating layer(s) is/are porous and have an average pore diameter smaller than that of the support. The separating layer can be deposited either directly on the porous support (case of a single-layer separation layer), or on an intermediate layer with a smaller average pore diameter, itself deposited directly on the porous support (case of a multilayer separation layer). Thus, part of the fluid medium to be filtered passes through the separating layer(s) and the porous support, so that this treated part of the fluid, called permeate, flows through the external peripheral surface of the porous support. The separating layers delimit the surface of the filtration membrane intended to be in contact with the fluid to be treated and in contact with which the fluid to be treated circulates.

The porosity of the monolithic inorganic support 1 is open, that is to say it forms a network of pores interconnected in all three dimensions, which allows the fluid filtered by the separating layer(s) to pass through the porous support and to be recovered at the periphery. The permeate is therefore recovered on the peripheral surface of the porous support.

The monolithic inorganic porous support 1 has an average pore diameter ranging from 0.5 µm to 50 µm. The porosity of the monolithic inorganic porous support 1 is comprised between 10 and 60%, preferably between 20 and 50%.

By "average pore diameter" is meant the value d50 of a volume distribution for which 50% of the total volume of the pores correspond to the volume of the pores with a diameter smaller than this d50. The volume distribution is the curve (analytical function) representing the frequencies of the volumes of the pores as a function of their diameter. The d50 corresponds to the median separating into two equal parts the area located under the frequency curve obtained by mercury penetration. Particularly, the technique described in standard ISO 15901-1: 2005 can be used with regard to the mercury penetration measurement technique.

The porosity of the support, which corresponds to the total volume of the interconnected voids (pores) present in the considered material, is a physical quantity comprised between 0 and 1 or between 0% and 100%. It conditions the flow and retention capacities of said porous body. In order for the material to be used in filtration, the total interconnected open porosity must be a minimum of 10% for a satisfactory filtrate flow rate through the support, and a maximum of 60% to guarantee a suitable mechanical resistance of the porous support.

The porosity of a porous body can be measured by determining the volume of a liquid contained in said porous body by weighing said material before and after prolonged residence in said liquid (water or other solvent). Knowing the respective densities of the material considered and of the liquid used, the mass difference, converted into volume, is directly representative of the volume of the pores and therefore of the total open porosity of the porous body.

Other techniques allow accurately measuring the total open porosity of a porous body, including:
- mercury intrusion porosimetry (aforementioned ISO 15901-1 standard): injected under pressure, the mercury fills the pores accessible to the implemented pressures, and the volume of mercury injected then corresponds to the volume of the pores,
- small-angle scattering: this technique, which uses either a neutron radiation or X-rays, provides access to physical quantities averaged over the entire sample. The measurement consists of the analysis of the angular distribution of the intensity scattered by the sample,
- the analysis of 2D images obtained by microscopy,
- the analysis of 3D images obtained by X-ray tomography.

The monolithic inorganic porous support 1 according to the invention is prepared by the sintering of a manipulable three-dimensional raw structure 2, which is constructed in accordance with a 3D digital model M by the superposition of strata $3_i$ of an inorganic composition 4 using a three-dimensional printing machine I including in particular a horizontal, optionally removable, plate 5 above which at least one extrusion head 6 is disposed (FIG. 1).

By "three-dimensional raw structure" 2 is meant a three-dimensional structure obtained from the superposition of strata $3_i$ of an inorganic composition 4 and which has not yet undergone a sintering. The shape and the dimensions of this raw structure are determined stratum after stratum by the 3D digital model M. This three-dimensional raw structure 2 is qualified as "manipulable" because it does not deform under its own weight, and may even have tilts, thanks to an accelerated consolidation which gives it a stable mechanical rigidity over time, as will be explained below. This three-dimensional raw structure 2 can thus be detached from the horizontal plate 5 to be moved without deformation or break, in particular to subsequently undergo a heat treatment operation necessary to obtain a monolithic porous support in accordance with the invention.

Within the framework of the invention, a "stratum" $3_i$ is defined by a set of strings $7_{i,j}$, whether continuous or discontinuous, juxtaposed or not juxtaposed, which are extruded at the same altitude z in accordance with the 3D digital model M predefined for said altitude z (with i being an integer ranging from 1 to n, n being an integer representing the total number of strata forming the manipulable three-dimensional raw structure 2 in accordance with the 3D digital model M). For reasons of clarity, most of the figures represent strata composed of a single string. However, very often within the framework of the invention, a stratum $3_i$ is formed by the juxtaposition of several continuous or discontinuous strings $7_{i,j}$.

Within the framework of the invention, a "string" $7_{i,j}$ corresponds to the strip of inorganic composition 4 which takes shape at the end of the extrusion head 6 (with i being an integer ranging from 1 to n, n being an integer representing the total number of strata forming the manipulable three-dimensional raw structure 2, and j representing an integer corresponding to the string considered within the stratum to which it belongs, j ranging from 1 to m, m representing the total number of strings in the considered stratum).

The 3D digital model M is determined by computer design software, in order to construct the three-dimensional raw structure 2. This 3D digital model M corresponds to a virtual structure divided into successive strata $3_i$ thanks to a slicing software which allows, if necessary, when the three-dimensional structure has tilts, defining the need for and the position of pillars to ensure a supporting means for the three-dimensional raw structure under construction and prevent it from collapsing.

The extrusion head 6 of the three-dimensional printing machine I is supported by a displacement mechanism (not represented in the figures), such as a robot, allowing its displacement along at least three axes (x, y and z). Thus, the extrusion head 6 can be moved along a horizontal plane (x and y axes) and vertically (z axis), thanks to the displacement mechanism which is driven by a computer R of all types known per se. This computer R controls the movements of the displacement system and consequently of the extrusion head 6, along a predetermined path in accordance with the 3D digital model M from which the three-dimensional raw structure 2 is made which allows obtaining the monolithic inorganic porous support 1 after a heat treatment operation.

The extrusion head 6 includes an inlet for the inorganic composition 4 (not represented in the figures). As represented in the figures, the extrusion head 6 also includes a calibrated flow orifice 8, such as a nozzle, movable in accordance with said 3D digital model M. According to the method for the invention, the inorganic composition 4 is introduced into the extrusion head 6 of the machine through an inlet in order to supply the flow orifice 8. A mechanical action can be applied to introduce the inorganic composition 4 into the head 6 through this inlet.

Within the framework of the invention, by "mechanical action" is meant the application of a pressure by any known technical means, such as, for example, a piston, a pump or an extruder. This step can be carried out in the usual way by those skilled in the art and will not be detailed here.

The flow orifice 8 is placed opposite and in the vicinity of the horizontal plate 5. The flow orifice 8 is movable, vertically (i.e. along the z axis) and horizontally (i.e. along the x and y axes), relative to the horizontal plate 5 which is fixed. The vertical and/or horizontal displacement of the flow orifice 8 relative to the fixed horizontal plate 5 allows the construction in accordance with the 3D digital model M of the manipulable three-dimensional raw structure 2 bearing on the horizontal plate 5 following the extrusion of the string $7_{i,j}$ of inorganic composition 4 through the flow orifice 8.

According to the embodiment illustrated in the figures, the extrusion head 6 is provided with a flow orifice 8 of circular section. When the flow orifice 8 is of circular section, its diameter D is advantageously from 0.1 mm to 10 mm, preferably from 0.1 mm to 1 mm and preferably from 0.1 to 0.7 mm. However, the flow orifice 8 is not necessarily of circular section, and another shape could be envisaged.

The inorganic composition 4 is advantageously ceramic and/or metallic in nature. The inorganic composition 4 is composed of a powdery solid inorganic phase and a matrix. The inorganic composition 4 is therefore not a powder, but a paste.

The powdery solid inorganic phase of the inorganic composition 4 comprises one or more solid inorganic material(s), each in the form of particles with an average diameter comprised between 0.1 μm and 150 μm.

The notion of average diameter is associated with that of particle distribution. Indeed, the particles of a powder have rarely a single or monodisperse size and a powder is therefore most often characterized by a size distribution of its particles. The average diameter then corresponds to the average of a distribution of the sizes of the particles. The distribution can be represented in different ways, such as a frequency or cumulative distribution. Some measurement techniques directly give a number-based (microscopy) or mass-based (sieving) distribution. The average diameter is a measurement of the central tendency.

The mode, the median and the average are among the most widely used central trends. The mode is the most frequent diameter in a distribution: it corresponds to the maximum of the frequency curve. The median represents the value where the total frequency of the values above and below is identical (in other words, the total number or volume of particles is the same below and above the median). The average must for its part be calculated and it determines the point where the moments of the distribution are equal. For a normal distribution, the mode, the average and the median coincide, while they differ in the case of a non-normal distribution.

The average diameter of the particles constituting an inorganic powder can be measured in particular by:
  laser light diffraction for particles ranging from 3 mm to approximately 0.1 μm,
  sedimentation/centrifugation,
  dynamic light scattering (DLS) for particles ranging from 0.5 μm to 2 nm,
  analysis of images obtained by microscopy,
  small-angle X-ray diffraction.

Most often, the inorganic composition 4 comprises as powdery inorganic material(s), alone or as a mixture, an oxide and/or a nitride and/or a carbide and/or a metal. As examples of oxides which may be suitable within the framework of the invention, mention may in particular be made of metal oxides, and particularly titanium oxide, zirconium oxide, aluminum oxide and magnesium oxide, the titanium oxide being preferred. As examples of carbides, mention may in particular be made of metal carbides, and particularly silicon carbide. As examples of nitrides which can be used, mention may in particular be made of titanium nitride, aluminum nitride and boron nitride. As examples of metals which may be suitable within the framework of the invention, mention may in particular be made of titanium and stainless steel. According to one preferred embodiment, the inorganic composition 4 comprises at least one metal oxide as powdery inorganic material, and preferably titanium oxide.

The matrix of the inorganic composition 4 comprises one or more solvent(s). The solvent(s) can be aqueous or organic. As examples, mention may be made of water, ethanol or acetone.

In addition, the matrix of the inorganic composition 4 may comprise one or more organic additive(s). Advantageously, these organic additives are soluble in the solvent(s) of the matrix. The organic additive(s) suitable within the framework of the invention can be chosen by way of non-limiting examples among:
  the binders, and for example among the cellulose ethers such as hydroxyethyl cellulose which is a polymer, the arabic gum which is a polysaccharide, or the polyethylene glycol (PEG),
  the lubricants and the plasticizers, and for example among glycerol or stearic acid,
  the thickening agents and the gelling agents, and for example among xanthan gum or agar-agar which is a galactose polymer.

The mass content of powdery inorganic material(s) in the inorganic composition 4 can range from 50 to 90%, preferably between 80 and 85% by weight, relative to the total weight of the inorganic composition 4.

The mass content of matrix in the inorganic composition 4 can range from 10% to 50% by weight, preferably from 15 to 20% by weight, relative to the total weight of the inorganic composition 4.

Within the framework of the invention, the inorganic composition 4 has a suitable rheology in terms of fluidity for its extrusion through the calibrated flow orifice 8.

Within the framework of the invention, it is possible to adjust the rheology of the inorganic composition 4 thanks to the granularity of the powdery solid inorganic phase, and/or thanks to the nature of the organic additives when they are present and/or thanks to their respective proportions. Indeed, for example, the use of a matrix including one or more organic additive(s) soluble in one or more solvent(s) comprised in the matrix allows modifying the rheology of the inorganic composition 4.

By "granularity of the powdery solid inorganic phase" is meant the dimensions of the particles making up the powdery solid inorganic phase. The granularity is characterized by the concept of average diameter which is described above.

As represented in FIG. 2, a string $7_{1,1}$ of inorganic composition 4 is formed following the passage of the inorganic composition 4 through the calibrated flow orifice 8 thanks to a mechanical action. For that, a pressure ranging from 1 bar to 50 bars is applied upstream of the calibrated flow orifice 8, preferably ranging from 5 bars to 25 bars. Within the framework of the invention, the extrusion of the string at the outlet of the flow orifice 8 of the extrusion head 6 takes place at room temperature.

As illustrated in FIG. 3, as soon as the string $7_{1,j}$ of inorganic composition 4 is extruded through the flow orifice 8, the latter is deposited on the horizontal plate 5 to form a first stratum $3_1$, in accordance with the 3D digital model M predetermined by the computer design software, thanks to the horizontal displacement of the flow orifice 8 above the horizontal plate 5.

The flow orifice 8 moves horizontally, and therefore parallel to the horizontal plate 5, along a predetermined path in accordance with the 3D digital model M, to form the first stratum $3_1$. At this stage, a single stratum is formed on the horizontal plate 5. In the exemplary embodiment represented in FIG. 3, the first stratum $3_1$ has a circular shape including four orifices 9 of triangular shape with rounded angles. This shape is illustrated by way of example but is not limiting.

After the deposition of the first stratum $3_1$, the flow orifice 8 moves so that the deposited string $7_{2,1}$ forms the second stratum $3_2$ in accordance with the 3D digital model M, as represented in FIGS. 4 and 5. For that, the flow orifice 8 moves vertically (that is to say along the z axis) and horizontally (that is to say along the x and/or y axes) until the desired position. The extrusion of the inorganic composition 4 through the flow orifice 8 can be continuous or discontinuous. Thus, the second stratum $3_2$ is deposited on the first stratum $3_1$ by the superposition of the string $7_{2,j}$ on the previously deposited stratum $3_1$, in accordance with the 3D digital model M.

In the example illustrated in FIGS. 4 and 5, each stratum $3_i$ includes only one string of ceramic composition 4, the strings being aligned from one stratum $3_i$ to the adjacent stratum $3_{i+1}$. Nevertheless, preferably, each stratum $3_i$ can be formed of several strings $7_{i,j}$. In the embodiment illustrated in FIG. 6, the strata $3_1$ and $3_2$ are each formed by the juxtaposition of five strings, respectively $7_{1,1}$, $7_{1,2}$, $7_{1,3}$, $7_{1,4}$, $7_{1,5}$ on the one hand and $7_{2,1}$, $7_{2,2}$, $7_{2,3}$, $7_{2,4}$, $7_{2,5}$ on the other hand. The strings $7_{1,1}$ to $7_{1,5}$ and $7_{2,1}$ to $7_{2,5}$ are deposited at 90° from one stratum to another. The strings $7_{1,1}$ to $7_{1,5}$ are juxtaposed and continuous. The strings $7_{2,1}$ to $7_{2,5}$ are discontinuous in order to create a rectangular-shaped void, in the illustrated example.

When the string(s) $7_{2,j}$ are deposited, thus forming the second stratum $3_2$, the previously described step of vertically and horizontally moving the extrusion head 6 is repeated as many times as necessary, in order to form the manipulable three-dimensional raw structure 2 in accordance with the 3D digital model M, determined by the computer design software and the "slicing" software. The growth of the manipulable three-dimensional raw structure 2 is conducted along the z axis. More specifically, the manipulable three-dimensional raw structure 2 is built on the horizontal plate 5 by stacking of the strata $3_1$ to $3_n$ formed from the strings $7_{1,1}$ to $7_{n,m}$ in accordance with the 3D digital model M.

As represented in the figures, each stratum $3_i$ is characterized by a thickness e and the strings $7_{i,j}$ by a thickness e and a width L. The thickness e of a string $7_{i,j}$ is a dimension of said string $7_{i,j}$ taken between the flow orifice 8 of the extrusion head 6 and the surface of the preceding stratum $3_{i-1}$ or that of the horizontal plate 5 on which it is deposited. The thickness of the stratum $3_i$ is therefore identical to that of the string $7_{i,j}$, and each string $7_{i,j}$ has the same thickness e. The width L of the string $7_{i,j}$ is dependent on the volume flow rate of the inorganic composition 4 extruded through the calibrated orifice 8, on the speed of displacement of the calibrated orifice 8 and on the ratio e/D, D being the diameter of the flow orifice 8. In the exemplary embodiments represented in FIGS. 5 and 8, the strings $7_{i,j}$ and $7_{i+1,j+1}$ have the same width L.

The Applicant has observed that the mechanical strength of the three-dimensional raw structure could in some cases be insufficient when the consolidation is not accelerated, resulting in a deformation of the three-dimensional raw structure resulting from its collapse. This deformation can result from the collapse of insufficiently consolidated strata deforming under the weight of the strata deposited thereon. FIG. 7 illustrates this collapse phenomenon. The Applicant has observed that this deformation can also result from a collapse of the string immediately after its extrusion: a collapse of the string can take place directly out of the extrusion head, then generating a deformation of the cross section of the string, and in particular a final height of the string lower than the height planned in accordance with the 3D digital model. In the case where the three-dimensional structure includes a tilt, the deformation can also result from the collapse of the cantilevered string parts when the three-dimensional raw structure is built without supporting means.

To avoid any collapse phenomenon, an acceleration of the consolidation is achieved prior to the sintering step in order to rapidly improve the mechanical strength of the three-dimensional raw structure in accordance with the digital model M as illustrated in FIG. 8. In this case, each stratum $3_i$ keeps its initial shape and its initial dimensions over time, and particularly its initial thickness e and initial width L.

This acceleration of the consolidation is achieved as the building of the manipulable three-dimensional raw structure 2 using a consolidation device 10 which moves in a manner identical to the flow orifice 8. As illustrated schematically in FIG. 1, the consolidation device 10 is placed in the vicinity of the extrusion head 6, whether or not it is carried by the extrusion head 6. More specifically, the consolidation device 10 may or may not be secured to the extrusion head 6 or form part of the extrusion head 6. If the consolidation device 10 is not carried by the extrusion head 6, it follows its displacements. Thus, the acceleration of the consolidation is achieved as the inorganic composition 4 is extruded. Preferably, the acceleration of the consolidation is achieved as soon as the string at the outlet of the flow orifice 8 is extruded.

This consolidation device 10 allows accelerating the evaporation of at least one solvent comprised in the inorganic composition 4. In other words, the evaporation of the solvent(s) thanks to the consolidation device 10 is sufficiently rapid to impart a mechanical strength to the manipulable three-dimensional raw structure 2, and sufficient to avoid any collapse thereof, even when it has tilts. For that, the solvent(s) present in the string are then partially or totally evaporated.

The consolidation device 10 can be a convective device or a radiative device.

In the case of a convective consolidation device 10, one or more air jet(s) is/are oriented towards the string $7_{i,j}$: the evaporation is then carried out only by a renewal of the atmosphere around said string $7_{i,j}$. In addition, such a convective device can also be temperature-regulated, which allows a localized heating of the string and therefore an accelerated evaporation of the solvent(s). As represented in FIGS. 9, 10A and 10B, the consolidation device 10 may be integrated with the extrusion head 6 around the flow orifice 8. The convective consolidation device 10 may be in the form of a conical annular slot $10_1$ disposed around the flow orifice 8 (FIG. 10A), or in the form of several orifices 102 disposed around the flow orifice 8 (FIG. 10B).

In the case of a radiation-consolidation device 10, the solvent(s) is/are evaporated by application of a localized heating of the string $7_{i,j}$. As represented in FIG. 11, a radiative consolidation device 10 may be in the form of an annular radiative electrical resistance disposed around the flow orifice 8, being secured or not secured to the extrusion head 6.

The acceleration of the consolidation can be adjusted depending on the used inorganic composition 4. Indeed, depending on the nature of the inorganic composition 4, and in particular its rheology, the acceleration of the consolidation will have to be more or less important to avoid any phenomenon of collapse of the manipulable three-dimensional raw structure 2. The adjustment of the acceleration of the consolidation can be made by adapting the air stream, the temperature and/or the radiative energy generated by the consolidation device 10.

For example, when the solvent present in the inorganic composition 4 is water, the acceleration of the consolidation is achieved thanks to a localized heating of the string $7_{i,j}$ at the flow orifice 8 of the extrusion head 6 up to a temperature of up to 100° C.

According to the embodiment represented in FIGS. 5 and 8, the strata $3_i$ are of the same shape and dimension and are aligned (i.e. stacked along the z axis). Thus, a monolithic inorganic porous support 1 including one or more rectilinear channel(s) 11 can be manufactured. This embodiment is not limiting. For example, according to the embodiments illustrated in FIGS. 12A and 12B, the different strata $3_i$ are stacked along the z axis so that the manipulable three-dimensional raw structure 2 has a tilt or overhang or cantilever de resulting from a non-alignment of the string $7_{i,j}$ relative to the stratum $3_{i-1}$ on which it is deposited. The overhang angle α (corresponding to Arc tg (e/de)) represents the amplitude of the tilt: the smaller α, the greater the amplitude of the tilt.

The method of the invention, and particularly the acceleration of the consolidation of the string $7_{i,j}$ at the time of its deposition, and optionally the rheology of the inorganic composition 4, impart sufficient mechanical strength for the manipulable three-dimensional raw structure 2 not to deform and be mechanically stable over time even when it has a tilt, which allows eliminating the need for supporting means 12 which is usually necessary to avoid the collapse of a three-dimensional raw structure presenting a tilt (see FIG. 13 where a temporary supporting means 12 of a shape complementary to the three-dimensional structure under construction is printed simultaneously). This acceleration of the consolidation allows, for a given inorganic composition 4 and for given printing parameters (diameter of the flow orifice 8, speed of extrusion of the string $7_{i,j}$, speed of displacement of the extrusion head 6), adapting to the amplitude of the tilt. In summary, three-dimensional raw structures 2 can be built without a collapse phenomenon being observed, even when this structure has a tilt and in the absence of supporting means.

The presence of at least one tilt within the manipulable three-dimensional raw structure 2 allows the manufacture of a monolithic inorganic porous support 1 including at least one helical channel, as described in the application FR 3 060 410 of the Applicant. Such a porous support allows obtaining a tangential filtration membrane with a suitable geometry that allows reducing the risk of clogging of the separation layer, and therefore increasing the filtrate stream.

As illustrated in FIG. 14, the method according to the invention allows building a manipulable three-dimensional raw structure 2 by stacking of the strata $3_1$ to $3_n$ in accordance with the 3D digital model M.

Finally, once the manipulable three-dimensional raw structure 2 has been obtained, it is subjected to a heat treatment in order to carry out a sintering operation. For that, the manipulable three-dimensional raw structure 2 is placed in a furnace whose temperature varies between 0.5 and 1 time the melting temperature of at least one of the powdery solid inorganic materials present in the inorganic composition 4 and for a sufficiently long period of time to allow the sintering of this whole manipulable three-dimensional raw structure 2.

During the sintering step, the dimensions of the porous support 1 may vary relative to the dimensions of the manipulable three-dimensional raw structure 2. This variation depends on the nature of the inorganic composition 4 and on the sintering conditions. The computer design software used within the framework of the invention allows anticipating this variation and the 3D digital model M is determined based on it.

The method according to the invention allows obtaining a monolithic inorganic support 1 with an interconnected porous texture suitable for use in filtration, and particularly in tangential filtration. In addition, the thus obtained monolithic inorganic porous support 1 has a mechanical resistance suitable for use in filtration, and particularly in tangential filtration. More accurately, the monolithic inorganic porous support 1 withstands an internal pressure of at least 30 bars without bursting, and preferably at least 50 bars without bursting. A burst pressure corresponds to the pressure at which a support bursts under the effect of an internal pressure applied in the channels with water.

Figure 16B:
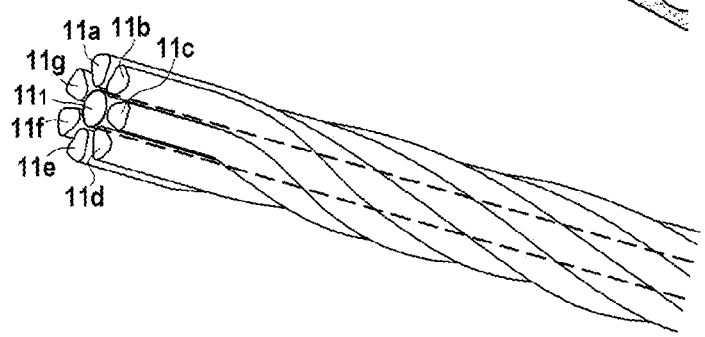
FIG. 16B is a perspective view of the channels of the support of FIG. 16A, a central channel and seven helical peripheral channels.

The three-dimensional structure constructed can be of any shape, and particularly of elongated shape, having a circular transverse cross section, and having a cylindrical external surface as illustrated in FIG. 15. This shape is nevertheless not compulsory and another shape could be envisaged according to the desired application. Indeed, the method according to the invention allows making monolithic inorganic porous supports 1 of various shapes. Particularly, when the monolithic inorganic porous support 1 is intended to be used in a tangential filtration membrane, it includes at least one channel 11 for the circulation of the fluid to be treated, and advantageously several channels 11. These channels 11 can be rectilinear or not rectilinear, interconnected or not interconnected. In the example illustrated in FIG. 15, the monolithic porous support 1 includes four channels 11 formed by the superposition of the orifices 9 of the stacked strata $3_1$ to $3_n$, said channels 11 being rectilinear, not interconnected and of triangular section with rounded angles. The geometry and the number of channels 11 are determined by the 3D digital model M chosen, and are therefore not limited to what is illustrated in FIG. 15. For example, as illustrated in FIGS. 16A and 16B, the support may include a rectilinear central channel $11_1$, and helical channels $11_a$, $11_b$, $11_c$, $11_d$, $11_e$, $11_f$, $11_g$ forming a spiral around the rectilinear central channel $11_1$.

According to a first embodiment, the method according to the invention allows the preparation of a single manipulable three-dimensional raw structure 2 at a time, resulting in a single monolithic porous support 1 at a time after sintering.

According to a second embodiment illustrated in FIG. 17, the method described above allows the simultaneous preparation of two independent manipulable three-dimensional raw structures $2_1$ and $2_2$, that is to say not connected together, intended to undergo a sintering step in order to form two monolithic porous supports $1_1$ and $1_2$. For that, the machine comprises two flow orifices $8_1$ and $8_2$: each independent manipulable three-dimensional raw structure $2_1$ and $2_2$ is then prepared by stacking of strata each made respectively from a string each from a separate flow orifice, respectively $8_1$ and $8_2$. In the example illustrated in FIG. 17, the two manipulable three-dimensional raw structures $2_1$ and $2_2$ are of identical shape and dimensions and are constructed by an identical displacement of the flow orifices $8_1$ and $8_2$ which are preferably mounted secured to each other. However, the example illustrated is not limiting: it can be envisaged to prepare more than two manipulable three-dimensional raw structures at the same time, and in particular three or four, these manipulable three-dimensional raw structures being of identical or different shape and/or dimension.

According to a third embodiment, the method described above allows the preparation of a manipulable three-dimensional raw structure 2 in the form of several identical or different three-dimensional sub-structures detachable from each other. According to this embodiment, the three-dimensional sub-structures are connected together by at least one breakable bridge 13, formed using the string of inorganic composition 4, and preferably several bridges 13 of identical or different shape and/or dimension, spaced from each other, and preferably aligned.

According to this embodiment illustrated in FIG. 18, the method according to the invention allows the manufacture of a manipulable three-dimensional raw structure 2 in the form of two three-dimensional sub-structures $2_3$ and $2_4$ connected with several identical breakable bridges 13, over the entire height of the three-dimensional raw sub-structures $2_3$ and $2_4$. The two three-dimensional sub-structures $2_3$ and $2_4$ are of identical shape and dimension, and include four rectilinear channels 11 of triangular transverse cross section with rounded angles.

As illustrated in FIG. 19, this third embodiment also allows the manufacture of a manipulable three-dimensional raw structure in the form of three raw sub-structures $2_5$, $2_6$, $2_7$ connected in series by several breakable bridges distributed over the height of the three-dimensional structure. As represented, the three raw sub-structures $2_5$, $2_6$, $2_7$ are identical and include each a rectilinear central channel $11_1$ of circular section and seven helical channels $11_a$, $11_b$, $11_c$, $11_d$, $11_e$, $11_f$, $11_g$ of triangular section with rounded angles and forming a spiral around the rectilinear central channel $11_1$.

Alternatively, although not illustrated, the three-dimensional sub-structures can be connected by a single breakable bridge 13, present or not over the entire height of the manipulable three-dimensional raw structure 2, and can include channels in varied number and shape. Likewise, although not illustrated, the method according to the invention allows preparing more than three detachable three-dimensional sub-structures. Although not illustrated, the three-dimensional sub-structures prepared according to this latter embodiment may be of different shape and/or dimensions.

Before the sintering step, the bridge(s) 13 connecting the three-dimensional sub-structures may be broken, allowing producing monolithic porous supports after the sintering step.

The method according to the invention has the advantage of providing constant and uniform characteristics to the monolithic inorganic porous supports 1 in a single production step, and of allowing access to a wide variety of shapes. The method according to the invention also allows preparing monolithic inorganic porous supports 1 having a tilt without requiring supporting means during its manufacture.

The invention also relates to a monolithic inorganic porous support 1 obtained by the method according to the invention. Such a support presents the advantage of having a homogeneous structure and is able to be used as a filtration membrane support.

Finally, the invention relates to the method for preparing a tangential filtration membrane, as well as a tangential filtration membrane obtained by such a method.

In the tangential filtration membrane according to the invention, the wall of the circulation channel(s) 11 arranged in the monolithic inorganic porous support 1 is covered with at least one separating filtration layer which is intended to be in contact with the fluid to be treated and to ensure the filtration of the fluid medium to be filtered. The separating layer(s) is/are created after the formation of the monolithic inorganic porous support 1. The method for preparing a tangential filtration membrane in accordance with the invention then comprises the steps of preparing a monolithic inorganic porous support 1 according to the method described above, followed by (that is to say after the final sintering step for the preparation of the monolithic inorganic porous support 1) a step of creating one or more separating filtration layer(s). This method is advantageously described in patent FR 2 723 541 in the name of the Applicant.

The creation of the separating filtration layer can be made using any technique known to those skilled in the art. Particularly, the separating layer can be deposited on the walls of the channels 11 of the support 1 by application of a suspension containing at least one sinterable composition intended, after curing, to constitute a separating filtration layer. Such a composition has a constitution conventionally used in the production of the inorganic filtration membranes. This composition contains at least one oxide, one nitride, one carbide or one other ceramic material or a mixture thereof, the oxides, the nitrides and the carbides being preferred. The sinterable composition is suspended, for example in water. To eliminate the risk of presence of aggregates and to optimize the dispersion of the grains in the liquid, the suspension obtained is ground in order to destroy the aggregates and obtain a composition composed essentially of elementary particles. The rheology of the suspension is then adjusted with organic additives to meet the hydrodynamic requirements of penetration into the channels of the supports. The separating layer, once deposited, is dried and then sintered at a temperature which depends on its nature, on the average size of its grains and on the target cutoff threshold.

This separating filtration layer deposition step is repeated in the case of a multilayer separation layer.

The membrane according to the invention has good mechanical resistance. More specifically, the membrane according to the invention has an internal pressure of at least 30 bars without bursting, and preferably at least 50 bars. An internal pressure of 50 bars is commonly accepted as being necessary and sufficient to guarantee mechanical strength of the membranes during their operation.

EXAMPLE

A monolithic porous support in accordance with the invention is made in the form of three three-dimensional sub-structures connected to each other by breakable bridges. Each sub-structure includes seven helical channels helically winding around a rectilinear central channel with a pitch equal to 70 mm generating a slope (or overhang angle α) equal to 41.7°.

This monolithic porous support is prepared from an inorganic composition comprising (the percentages of the different components are mass percentages relative to the total weight of the inorganic composition):

TABLE 1

| Powdery solid inorganic phase | | Titanium oxide $D_{average}$ = 35 μm | 82.6% |
|---|---|---|---|
| Matrix | Solvent | Demineralized water | 11.5% |
| | Organic additives | Hydroxyethyl cellulose (Natrosol 250 HR) | 0.9% |
| | | Glycerol | 2.5% |
| | | Polyethylene glycol (PEG200) | 2.5% |

The matrix is prepared by dissolving the organic additives in water previously heated to 40° C. Then, the matrix is kneaded with the powdery solid inorganic phase for 3 hours in a Z-arm kneader of the Brabender brand.

The thus obtained inorganic composition is introduced into a "Delta WASP 2040" machine using a feed pipe pre-coated with oleic acid. The extrusion is carried out under a pressure of 6.8 bars through a calibrated flow orifice with a diameter of 1 mm.

The print parameters are:
Thickness of each stratum e=0.5 mm,
String extrusion speed=5 mm/sec.

The consolidation of the thus obtained three-dimensional structure is accelerated with a radiative consolidation device located in the extrusion head of the "Delta WASP 2040" machine. The extrusion head is made of dense sintered alumina with a conical peripheral air jet regulated to 100° C. (as illustrated in FIG. 10A).

The sintering is carried out in an electric furnace up to a temperature of 1,450° C. as follows:
Temperature rise: 100° C. per hour until reaching 1,450° C.,
Maximum temperature (1,450° C.) maintained in level for 4 hours,
Natural cooling.

The three-dimensional structure obtained has the following characteristics:
Height of the structure: 400 mm,
Average pore diameter: 15 μm,
Porosity: 34%,
Mechanical resistance: burst pressure: 98 bars,
Effective sintering shrinkage: 2.5%.

The average pore diameter is determined using the technique described in ISO 15901-1: 2005 standard with regard to the mercury penetration measurement technique.

The porosity is measured by determining the volume of liquid that can be contained in the support, as detailed above.

The burst pressure is measured, after having obstructed the pores with the liquefied paraffin, using a device which allows filling the channels with water and increasing the pressure of this water present in the channels until bursting of the tested support. The device allows recording the maximum pressure reached before the bursting.

The effective sintering shrinkage is measured by metrology.

The invention is not limited to the described and represented examples because various modifications can be made without departing from its framework.

The invention claimed is:

1. A method for manufacturing a monolithic inorganic porous support for a tangential filtration membrane, in which is arranged a channel for the circulation of a fluid medium to be treated, comprising:
providing a 3D printing machine having an extrusion head movably mounted in space relative to, and above, a fixed horizontal plate;
providing the 3D printing machine with an inorganic composition comprising a powdery inorganic phase and a matrix that form a paste;
wherein the inorganic phase comprises particles having an average diameter of from 0.1 μm to 150 μm;
depositing, stratum by stratum, a string of the inorganic composition onto the plate, and building a manipulable and three-dimensional green structure with the string based on a 3D digital model;
wherein each stratum is a set of strings extruded at the same altitude relative to the plate in accordance with the 3D digital model predefined for said altitude;
accelerating a consolidation of the green structure by evaporating a solvent contained in the matrix with a convective or radiative consolidation device, as the string is extruded, and in accordance with the 3D digital model;
sintering the green structure at a temperature that is from 0.5 to 1.0 times the melting temperature of material forming the powdery solid inorganic phase, to form the support;
wherein the support has an interconnected open porosity of from 10% to 50%,
wherein the support has an average pore diameter of from 0.5 μm to 50 μm; and
wherein the support is able to withstand an internal pressure of at least 30 bars without bursting.

2. The method according to claim 1, comprising forming the green structure with a tilt, without implementing a supporting means.

3. The method according to claim 1, wherein the powdery solid inorganic phase comprises at least one of a titanium oxide, an aluminum oxide, a zirconium oxide, a magnesium oxide, a silicon carbide, titanium, and stainless steel.

4. The method according to claim 1, wherein the matrix comprises a solvent, and an organic additive that is soluble in said solvent.

5. The method according to claim 4, wherein the rheology of the inorganic composition is adjusted using at least one of the following characteristics: the granularity of the powdery solid inorganic phase, the choice of the organic solvent, and the proportion of the organic additive.

6. The method according to claim 1, wherein the consolidation of the green structure is accelerated using a convective consolidation device that provides a heating of the string, or a renewal of the atmosphere around the string, sufficient to allow an accelerated evaporation of a solvent contained in the matrix.

7. The method according to claim 1, wherein the consolidation of the green structure is accelerated using a radiative consolidation device that provides a heating sufficient to allow an accelerated evaporation of a solvent contained in the matrix.

8. The method according to claim 1, wherein the green structure is in a form of several three-dimensional substructures detachable from each other.

9. The method according to claim 8, wherein the green structure is in a form of several three-dimensional substructures connected and held together by a breakable bridge made using the string.

10. A method for preparing a tangential filtration membrane, comprising:
manufacturing the monolithic inorganic porous support according to the method of claim 1; and
creating a separating layer on the walls of the channel.

11. A tangential filtration membrane prepared according to the method of claim 10.

12. The method according to claim 3, wherein the inorganic phase is an oxide selected from the group consisting of a titanium oxide, an aluminum oxide, a zirconium oxide, and a magnesium oxide.

\* \* \* \* \*